May 22, 1956 G. R. GRUNEWALD ET AL 2,746,846
PROCESS AND APPARATUS FOR COUNTERCURRENTLY CONTACTING FLUIDS
Filed Aug. 3, 1953 2 Sheets-Sheet 1
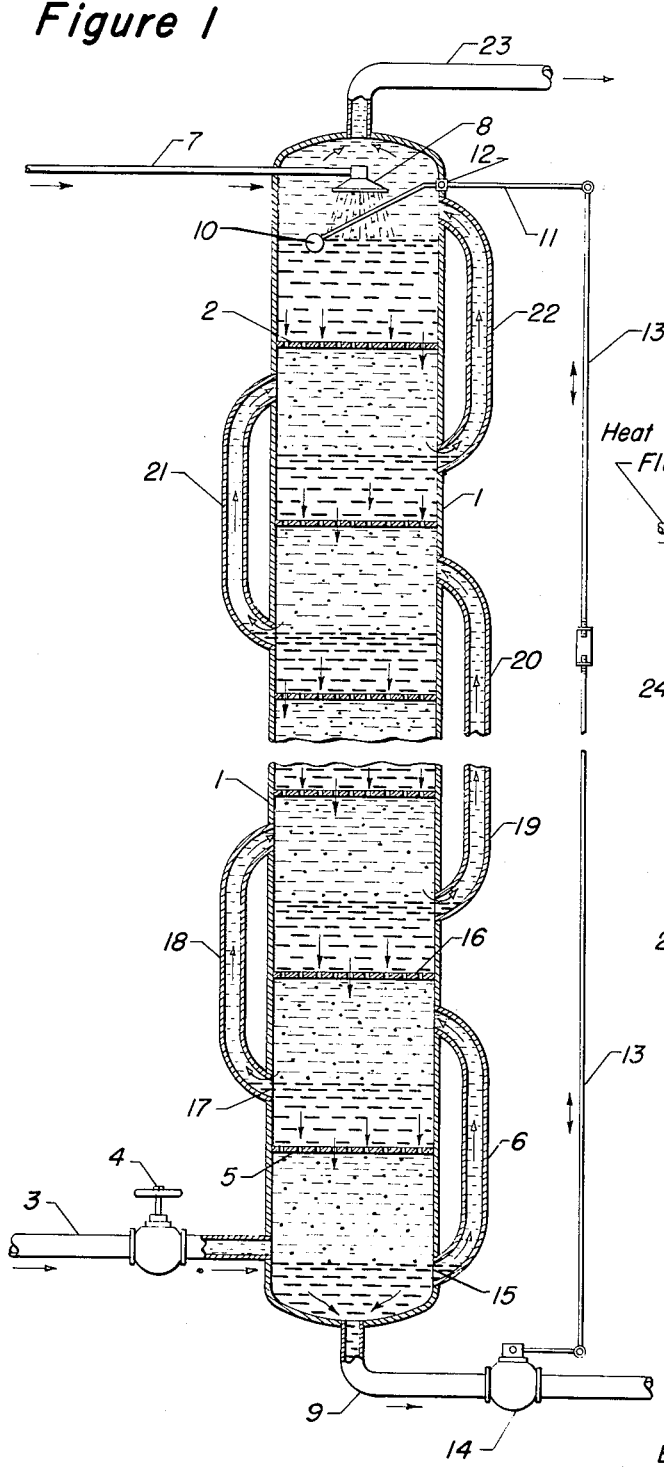
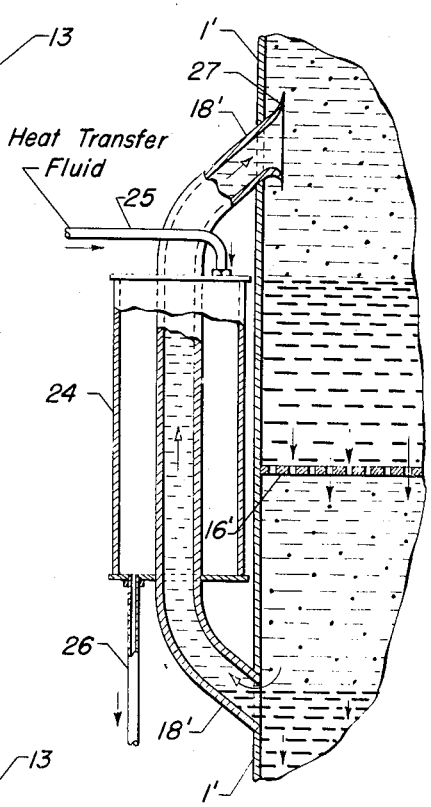
INVENTORS:
Glen R. Grunewald
Fred J. Pierce
By: Chester J. Giuliani
Donald E. Moehling
ATTORNEYS:

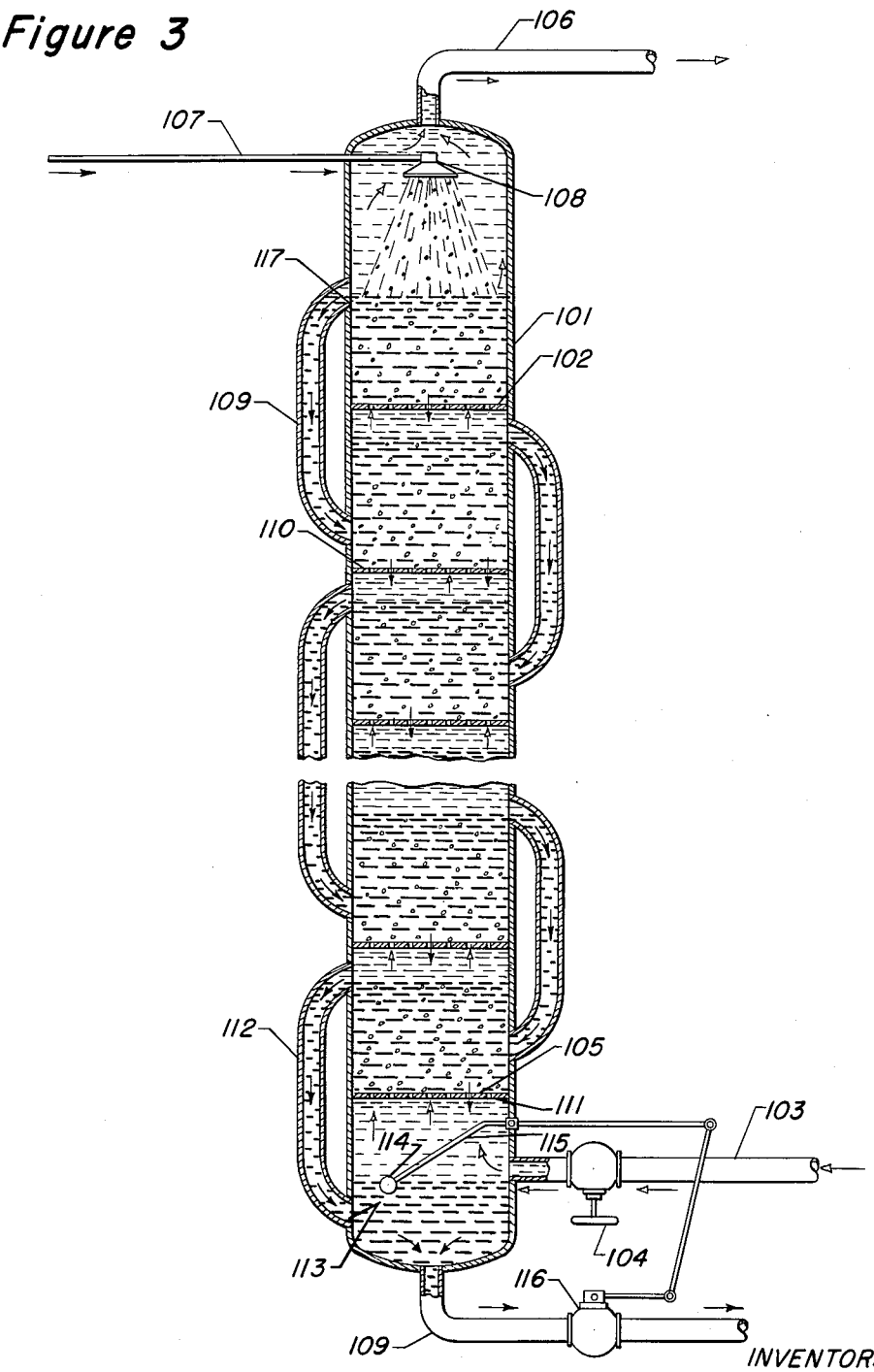

United States Patent Office 2,746,846
Patented May 22, 1956

2,746,846

PROCESS AND APPARATUS FOR COUNTER-CURRENTLY CONTACTING FLUIDS

Glen R. Grunewald, Chicago, and Fred J. Pierce, La Grange, Ill., assignors to Universal Oil Products Company, Des Plaines, Ill., a corporation of Delaware Application August 3, 1953, Serial No. 371,981

6 Claims. (Cl. 23—310)

This application is a continuation-in-part of our co-pending application, Serial No. 292,494, filed June 9, 1952, now Patent No. 2,647,856.

This invention relates to a process and an apparatus for countercurrently contacting several fluids of different specific gravities and of incomplete miscibility. More specifically, the invention concerns a liquid-liquid or liquid gas countercurrent solvent extraction or absorption process and a column suitable for performing such process and means for dispersing one of the fluid phases in countercurrent contact with the other phase.

The invention provides a solution for one of the major problems associated with the operation of present countercurrent contact or extraction column utilizing perforated or so-called sieve-deck trays and a liquid as at least one of the fluid phases in the column. These problems primarily arise from the difficulty of concurrently maintaining the interface between the fluid phases on a plurality of perforated trays within the column at a constant level during the extraction, a condition which is essential for satisfactory operation of the extraction column. In most sieve-deck columns of earlier design the column is difficult to control and in many cases operates in the absence of a second phase on one or more of the trays, particularly when some of the tray perforations become clogged during operation, resulting in a large loss of column efficiency. This invention provides a process, and apparatus therefor, wherein a constant interface level between fluid phases is maintained in each of a plurality of contacting zones or sections, thus effecting uniform equilibrium conditions in each zone and achieving an operation which is both highly efficient and easy to control. When applied to a liquid-liquid or liquid-gas extraction the present process and apparatus permit more efficient contact of raffinate and extract phases and greater control of the flow of said phases, thereby yielding improved separation results, and generally allowing the use of smaller quantities of extractant.

Thus, the invention concerns a process for effecting countercurrent contact between two fluids of incomplete miscibility and of different densities, at least the denser fluid being a liquid, wherein the denser fluid is continuously introduced into the highest zone of a plurality of superimposed contacting zones and passed downwardly through these zones and the lighter fluid is continuously introduced into the lowest one of these zones and passed upwardly through the zones. More particularly, the present invention is directed to the procedure for putting in operation the counter-current contacting process hereinabove referred to and to an especially preferred apparatus in which such countercurrent process may be effected. According to the present invention, the extraction apparatus which contains N contacting zones is put into operation by at least partially filling one or more contacting zones with light fluid, thereafter introducing heavy liquid into one of the upper contacting zones whereby an upper layer of the lighter fluid and a lower layer of the denser fluid are established in each of N contacting zones, N being at least 2, fluid from one of said layers in each of N–1 contacting zones is passed into an adjacent zone and in dispersed state through and in direct contact with the layer of the other fluid therein and then into the layer of like fluid in said adjacent zone, fluid from the other of said layers in each of N–1 zones is passed from approximately the interface between the fluid layers therein through at least one transfer conduit in a confined, substantially unbroken stream into the layer of like fluid in an adjacent zone, thus providing a continuous phase of the latter fluid between each adjacent contacting zone, a stream of the lighter fluid is withdrawn from the highest contacting zone, a stream of the denser fluid is withdrawn fror the lowest contacting zone, and the flow of the denser fluid is so controlled that the outlet of the transfer conduit is maintained surrounded by the fluid effluent thereof in that zone which in the direction of flow of this same fluid is the last zone containing an interface between layers. In the present preferred method of operating the column, the continuous fluid phase is passed between adjacent contacting zones through external transfer conduits which connect the fluid layer in each zone with the same fluid layer in the next adjacent upper and lower zones.

The apparatus provided by the present invention as a preferred device for carrying out the present process comprises in combination a vertically elongated column, vertically spaced substantially horizontal perforated partitions dividing the column into a plurality of contacting sections, an inlet conduit connecting to the highest section for supplying fluid thereto, an outlet conduit connecting to the lowest section for removing fluid therefrom, flow-controlling means at least one of these conduits, a light fluid supply conduit connecting to the lowest section, a right fluid withdrawal conduit connecting to the highest section, each two adjacent sections being connected with each other by at least one fluid transfer conduit externally positioned with respect to the contacting sections and having an upper opening above and a lower opening below the partition therebetween, the upper transfer conduit opening within each section being at a higher elevation than the lower opening of a transfer conduit connecting to the next higher section, and means associated with the column for determining the level of an interface between layers of fluid in at least one of the contacting sections.

Other features relating to specific aspects of the process and apparatus of the present invention and to various alternative modifications therein will become apparent from the following more detailed description of the invention.

In the countercurrent fluid-fluid contacting or extraction operations with which the invention is concerned, either the fluid of higher density, or that of lower density, is passed in finely divided droplet form through a layer of the other fluid in at least one contacting zone. At least a second contacting zone is required for the operation and is separated from the first contacting zone by a substantially horizontal, perforated partition. The one or more transfer conduits in the apparatus preferred for practicing the present process are externally positioned in relation to the contacting sections and extend in an essentially vertical direction around the one or more partitions, which divide the column horizontally. These external conduits serve to conduct a stream of the aforesaid continuous fluid phase in a substantially unbroken flow from its layer in one zone to its layer in the next zone. The division of one of the fluid streams into dispersed or droplet state results from its being forced through the perforations of the partition or sieve-deck into the next zone in its path of flow. Preferably, more than two zones and usually less than 100 zones, all similarly separated, are employed, although there is no specific upper limit and as many as 200 or even more contacting zones may be provided.

When a column containing more than two contacting zones is employed wherein the denser fluid is to be passed in the discontinuous phase or dispersed state through and in direct contact with the lighter fluid while the latter is maintained as the continuous phase, a layer of the denser fluid must be employed in each of at least the two lowest contacting zones and, if desired, may be used in all contacting zones of the column. When the lighter phase is to be passed in the dispersed state through and in direct contact with the denser fluid while the latter is the continuous phase, all contacting zones will contain a layer of each fluid, regardless of the number of zones in the column. Thus, an operation using the denser fluid as the discontinuous phase is considerably more flexible and for this reason constitutes a generally preferred embodiment of the present process.

An important feature of the process of this invention resides in the maintenance of the interface level between the fluid phases in the several zones by maintaining the interface level in that zone which, in the general line of flow of the continuous fluid phase is the last zone containing an interface between layers. This level maintenance is accomplished by controlling the flow of the denser fluid with an interface level sensing means in this last-mentioned zone. The contacting zone in which the control of the interface is to be applied will therefore depend upon whether the lighter or the denser fluid is the continuous phase during the operation. If the denser fluid is the continuous phase, the level maintenance is always applied in the lowest contacting zone, since it is this zone which is the last zone in the line of flow of the denser fluid containing an interface between layers. When, however, the lighter fluid is the continuous phase, the interface level maintenance or control is applied in the highest zone that contains an interface between layers. Since, in this arrangement there may be layers of the denser fluid in as few as two zones, namely the two lowest contacting zones (that is, where $N=2$), there may be no interface in any zone above that next to the lowest zone, and in such case the interface level control will be applied by regulating the flow of the denser fluid so that the interface between layers is maintained constant in the lowest zone containing an interface. When the column is similarly operated with the lighter fluid in the continuous phase, but with layers of both fluids, and hence interfaces, in all zones, ($N=$total number of zones in the column), the interface level control will be applied in the highest zone of the column, namely by regulating the flow of the denser fluid so that the interface between phases in the highest zone is maintained at the desired level. When the lighter fluid is the continuous phase and two or more, but less than all, zones contain an interface, the zones above the highest which does contain an interface, are substantially filled with the upwardly flowing lighter fluid, except for the amount of the denser fluid passing downwardly therethrough in more or less random streams and without building layers.

The apparatus and process are particularly suitable for the extraction of a specific component or a class of components from a selected liquid or gaseous charging stock utilizing a solvent which is selective for the component or class of components to be recovered. The apparatus and process may also be used for countercurrently washing one liquid with another liquid to remove certain impurities or to recover certain components therefrom, the liquids being substantially immiscible in each other and of different specific gravities. The present process and apparatus may also be applied to countercurrently washing a gaseous stream with a liquid solvent to recover or remove a particular component, such as a liquid fog or vapor from the gas. It is an inherent qualification in fluid-fluid extraction, of course, that the component to be recovered be more soluble in the extractive solvent than the remaining undesired component or components accompanying the former in admixture therewith. Thus, the system may be utilized, for example, for the recovery of aromatic hydrocarbons from liquid hydrocarbon charging stocks, such as petroleum fractions containing also paraffinic and/or naphthenic or olefinic hydrocarbons; for the removal of undesired components, such as phenolic or sulfur-containing compounds from gasolines, utilizing an aqueous caustic solution as the extracting agent; for washing gaseous mixtures with a liquid solvent to remove one or more components of the gas, as for example, in the removal of sulfur dioxide from air containing same; for recovery of metallic salts, such as silver and mercury salts, from aqueous solutions, utilizing a water-immiscible solvent for the salt, such as carbon disulfide; and for other uses in which counter-current, fluid-fluid contacting or extraction is desired for the separation of a particular component of one of the fluids. Suitable solvents for the purpose may be characterized generally as any gas or liquid which is a selective solvent for the component or components to be recovered or removed from the feed stock mixture. Thus, for example, selective solvents for the aromatic portion of aromatic-paraffinic hydrocarbon mixtures are such organic liquids as furfural, phenol and the glycols, such as diethylene glycol, triethylene glycol, dipropylene glycol, and $\beta,\beta$-dipropionitrile. Water is a common solvent for the extraction of metallic salts from organic media and may be utilized as a selective solvent therefor. Aqueous caustic solutions or aqueous amines may be utilized as extractive solvents for phenols.

The apparatus of the present invention and the alternative methods for carrying out the general process of the invention are further illustrated and described in Figures 1, 2 and 3 of the accompanying drawings which depict a vertical tubular tower containing a plurality of superimposed contacting zones or sections. A liquid-liquid extraction system is illustrated, because it represents one of the preferred systems to which the present invention may be applied. Although the process and apparatus of this invention are particularly effective for the recovery of one or more hydrocarbon components from a liquid hydrocarbon feed stock utilizing a liquid solvent or extractant, the feed stock may also consist of any other liquid mixture of separable components or a normally gaseous feed stock containing components which may be subjected to absorption in the gaseous condition in a liquid-solvent or which may be liquefied at suitable operating pressures and temperatures adapted to the present apparatus and thereafter subjected to solvent extraction. To simplify the description, the extraction is described with reference to a feed stock comprising a liquid petroleum naphtha fraction containing a specific aromatic hydrocarbon and naturally occurring azeotropes thereof; for example, benzene and azeotropes of benzene are present (the benzene azeotropes boiling within the range of from about 65° to about 81° C.). An aqueous diethylene glycol solution is used as selective solvent for the benzene component. The solvent in this case is the denser of the two liquid phases and is therefore introduced into the highest contacting zone of the column in accordance with the process of this invention. In other systems, however, the solvent may have lower specific gravity than the feed stock and thus may be introduced into the lower portion of the extraction column.

The apparatus and the process operation employing contact of the denser fluid in dispersed state with the lighter fluid as the continuous phase are described with reference to Figure 1 of the attached diagrammatic drawings. The extraction column comprises a vertical housing 1 in the form of a generally vertical tubular column containing multiple, substantially horizontally disposed perforated partitions or plates spaced vertically within and attached to the inner circumferential surface of the column. Such partitions or plates are also commonly called trays, decks, sieve decks or bubble decks. In Figure 1, sieve deck 2 comprises the uppermost plate in the extraction column. Each plate separates two contacting zones from each other. The highest plate serves to distribute solvent droplets into the contacting zone below this plate. In each contacting zone the relatively denser liquid solvent phase is countercurrently conducted in the form of finely divided droplets through a layer of the lighter fluid phase, which in the description of the present drawing is a liquid hydrocarbon naphtha. In the lower portion of the extraction column, preferably below the lowermost perforated plate thereof, a conduit 3 connects to the column for admitting naphtha feed stock. The feed stock initially introduced into the column through conduit 3 and valve 4, accumulates in a layer below the perforated partition in the lower portion of the column such as plate 5 and then flows upwardly in the column both through the perforations of plate 5 and through transfer conduit 6. During normal contacting operation, the upper portion of the transfer conduit 6 terminates in a layer of the hydrocarbon (the lighter and continuous phase) above plate 5 and the lower portion of this transfer conduit terminates in the hydrocarbon layer of the section or contacting zone below plate 5 to approximately the interface between this hydrocarbon layer and a layer of the solvent beneath it, thereby providing a continuous phase between the hydrocarbon layers in each and all of the contacting sections. When the column is initially put into operation, the naphtha feed stock is preferably run in until the column is filled with feed stock, and thereafter the solvent is introduced to gradually establish normal operation, that is, a dynamic equilibrium or balance between the respective solvent and feed stock streams, as hereinafter described.

The solvent selected for the purpose of illustration is, as aforesaid, an aqueous diethylene glycol, and contains an amount of water sufficient to provide a selective or preferential solvent for the aromatic hydrocarbon components of the feed stock; usually the aqueous glycol thus forming the selective solvent contains from about 5 to about 15% by weight of water. The solvent is introduced through solvent inlet 7 which is above the uppermost perforated partition 2 because the solvent is the denser of the two fluid phases and is used as the dispersed or discontinuous phase of the system. Solvent inlet conduit 7 may have a spray head 8 attached to the end of the conduit within the column for comminuting the liquid stream into finely divided droplets, thereby increasing the interfacial area of contact in the uppermost contacting zone between the solvent phase and naphtha or raffinate phase when the lean solvent is initially charged into the extraction column. The flow rates of solvent and naphtha into the column are determined by the withdrawal rates of the raffinate and extract phases from the column through their respective outlet ports, which, in turn, are dependent upon the purity and percentage recovery of the aromatic product to be extracted from the feed stock. Since the system contemplates continuous flow of both naphtha and solvent, the pressure on the naptha entering the bottom of the column will exceed the hydrostatic pressure of the dense and light liquids in the superimposed contacting zones above the feed inlet, plus the pressure drop due to flow resistance in the column. The raffinate, which is the residue of the naphtha feed stock after removal of at least a portion of the aromatic hydrocarbons during its flow upwardly through the column, accumulates above the uppermost plate 2 in the column and is withdrawn from the column through conduit 23.

A liquid level indicating or sensing device is provided preferably in at least the uppermost contacting zone of the extraction column, although the sensing device may also be placing in any lower contacting zone, except the lowermost when the capacity provided by the upper contacting section is not required for the particular operation. A level sensing device at this point may be used to signal the establishment or existence of layers of both solvent and naphtha in the highest zone. This is a reliable indication that two-phase contact is being realized in all zones and therefore that the column is being used at maximum efficiency. Such sensing device in the uppermost section further serves as the basis or guide for regulating the solvent flow rate to assure that the interface between phase layers in this highest zone is maintained at a safe operating distance from the outlet of the transfer conduit 22 which carries naphtha into the highest zone from the zone below it. An interface at or above the outlet of conduit 22 is undesirable because it increases the chance of solvent being entrained into the raffinate withdrawal conduit 23, and also because it may impair the efficiency of the column by causing the solvent to flow downwardly through conduit 22 as well as through the perforations in the deck 2.

The interface levels in all zones except the highest are automatically maintained at a suitable distance from the respective transfer conduit outlets by reason of the relative elevations of the conduit outlets and inlets in each zone. Therefore, level indicating or sensing means in zones below the highest zone and spaced at intervals throughout the height of the column are useful to indicate the number of contacting zones being used at maximum efficiency and also to establish the interface in all lower contacting zones when the column is operated with only part of the total number of existing contacting sections, as is occasionally desired when maximum efficiency is realized with the use of smaller numbers of contacting sections in operation. For example, in a column having 30 zones, level indicators showing the presence of a solvent layer in the 25th zone from the bottom but no solvent layer in the 28th zone, would demonstrate that at least 25 contacting zones were being used at maximum efficiency. If this number were insufficient to produce a satisfactory separation, the supply rate of the solvent would then be increased until an interface appeared in the 28th zone, or further until an interface appeared in the 30th (and highest) zone. In the latter case the rate of flow of the solvent would then be readjusted and preferably controlled to prevent the level of the solvent from approaching the outlet of the transfer conduit admitting naphtha into the highest zone.

The level sensing devices may be automatic instruments which indicate prevailing interface levels, or indicate and record, or even indicate, record and serve to automatically maintain interface levels. Such automatic maintenance of interface levels may be accomplished by the use of any suitable mechanical devices which in response to variations of an interface level bring about such an adjustment of the rate of solvent inlet or extract outlet flow that the interface level is restored. Non-automatic devices, such as for example, simple sight glasses may be employed, any necessary adjustments of interface levels being in such case made manually.

The liquid level control device illustrated in Figure 1 and placed at the interface on the uppermost plate 2 comprises an interface level sensing element such as ball float 10 attached to a lever arm 11, pivotally connected to the column housing at a fulcrum point 12, the arm 11 protruding from the column housing and connecting outside of the column, beyond the fulcrum to a connecting rod 13 which actuates a suitable solvent inlet or extract outlet flow control means, such as extract outlet valve 14, the connecting rod raising or lowering the valve seat in valve 14, thereby determining the flow of extract from the extraction column in response to the rise and fall of the interface level between the dense liquid and light fluid on the uppermost plate of the column and in cooperation with the ball float sensing element at the interface on said plate. In the operation of the column wherein the interface level control on the uppermost plate is determined by control of the extract outlet rate of flow, the naphtha feed stock rate and solvent inlet rate of flow are controlled at a predetermined value for obtaining a certain desired recovery of aromatic hydrocarbon. Any rise of the interface level in the uppermost contacting zone on plate 2, due to the accumulation of dense or lower phase on the plate, causes in response thereto the interface level sensing element (ball float 8) to rise, which in turn forces connecting rod 10 downwardly and opens extract outlet valve 14. The latter permits an additional quantity of extract to flow from the column through conduit 9 and re-establishes the desired level.

In the actual operation of the column, the rise and fall of the interface levels on each of the perforated plates is relatively minute and the pressure variations within the column fluctuate through a very narrow range; the flow of dense phase through the perforations on each of the plates is at a substantially constant rate when the column is in equilibrium; the flow of solvent and feed stock through their respective inlet conduits into the column is continuous; the flow of raffinate from the column is constant and continuous; valve 14 opens and closes only partially to accommodate the slight pressure variations and the flow of extract from the column is therefore substantially constant and continuous; the entire column appears to be in balanced operation. It is characteristic of the equilibrium operation of the column that the rate of transfer of both dense and light liquids between each of the plates is uniform and the total amount of both dense and light fluids exchanged between the contacting zones on each plate is uniform throughout the column. Although the size and number of perforations in each plate is desirably the same for all of the plates in order to provide maximum efficiency of extraction, the fact that one or more of the perforations in one or more of the sieve decks becomes clogged does not interrupt the operation of the column or cause a diminution of either of the fluid layers above any of the plates, the rate of flow through the remaining perforations automatically being increases to compensate for the loss in flow through the clogged perforation or perforations. The perforated partitions in effect act as redistributing means for the phase (either the light or heavy fluid) passing through the perforations in a discontinuous stream and thus contain as many perforations as possible, consistent with the formation of discreate droplets of the discontinuous phase, in order to effect maximum countercurrent distribution of the discontinuous stream in the continuous phase.

The process embodiment illustrated in Figure 1 may be further described by following through a start-up of the system, which, as stated above, is preferably begun by first establishing a flow of naphtha through the column.

Before any solvent is admitted to the column, the upward flow of naphtha is partly through the perforations of the partitions and partly through the transfer conduits, the flow distribution being that which produces equal pressure drops through the transfer conduits and perforations. Upon admission through conduit 7 and spray head 8, the solvent flows at random down through the perforations, more or less freely seeking the lowest level, displacing the naphtha and shifting to some extent the distribution of naphtha flow to an increased proportion flowing through the transfer conduits, which thus act as risers in the present embodiment.

By maintaining the rate of withdrawal of solvent at line 9 lower than the rate of charging fresh solvent through line 7, a layer of solvent is caused to accumulate in the lowermost zone. When the level of that layer approaches the inlet 15 of the transfer conduit or riser 6, it tends to constrict the flow of naphtha into the riser, or external conduit 6, thus increasing the pressure drop accompanying naphtha flow into and through the riser. Minor amounts of solvent may be pushed up into the riser, further increasing the hydrostatic pressure head opposing the flow of naphtha through the riser. This increased opposition to the flow of the naphtha through the riser immediately shifts the distribution of upward naphtha flow toward an increase of flow through the perforations, with a consequent reduction in flow of solvent downwardly through the perforations. This causes a rapid accumulation of a solvent layer above the deck 5. As this layer increases in height, the resistance to the flow of naphtha through the perforations increases, owing to the hydrostatic head of solvent developing above the deck, until substantially all of the naphtha is caused to flow through the riser 6.

Throughout this period of accumulating a layer of dense liquid on deck 5, the downward flow of solvent through the perforations automatically remains substantially equal to the rate of withdrawal of solvent from the bottom of the column. This necessarily occurs because: (1) a lesser solvent flow through the perforations would allow the solvent level in the lowermost zone to fall, decreasing the pressure necessary to maintain a constant rate of naphtha flow into and through the riser, and such decreased pressure would permit sufficient increase in downward solvent flow to raise the solvent level in the lowermost zone to its former height; (2) a greater solvent flow through the perforations would cause the solvent level in the lowermost zone to rise, causing an increase in the pressure necessary to maintain a constant rate of naphtha flow into and through the riser, and such increased pressure would cause sufficient decrease in downward flow of solvent to drop the solvent level in the lowermost zone to its former height. The operation is so responsive and time lags are so negligible that the rate of flow of solvent through the perforations is practically identical to the rate of solvent withdrawal at all times. It follows that changes in the rate of solvent withdrawal are accompanied by corresponding changes in the rate of solvent flow downwardly through the tray perforations.

In time, the solvent layer above deck 5 approaches the inlet 17 to the external conduit 18 having its upper open end in the light fluid layer (hydrocarbon) above the next higher deck 16, and the same process is repeated with respect to that deck, and then succeeding higher decks. For the same reasons as given above with reference to the solvent flow through the lowermost deck, the downward flow of solvent through each of the higher decks, upon accumulation of a solvent layer thereon, is automatically maintained substantially at the same rate as the rate of solvent withdrawal from the solvent layer in the bottom of the column.

Similarly, in all of the successive higher contacting zones in which a layer of solvent is established, except the highest, the upper level of the solvent (that is the interface between layers) is automatically maintained approximately at the level of the inlet to each external conduit or riser. In the highest of the contacting zones which contain a solvent layer, the level of the interface between layers may be at any point below the level of the external conduit inlet.

The solvent withdrawal through line 9 will be maintained at a lesser rate than the rate of solvent input at the top of the column until a layer of solvent is obtained on each of the desired number of decks. The column may be maintained in stable, dynamic equilibrium using any desired number of contacting zones greater than 1. When the desired number of solvent layers has been established, the rate of solvent supply through line 7, or the rate of solvent withdrawal through line 9 is adjusted so that they will balance.

The system illustrated by Figure 1 may also be started up by first introducing the solvent and then admitting the naphtha, or by simultaneously introducing both solvent and naphtha through lines 7 and 3, respectively, but these methods require longer times for establishing equilibrium conditions and are generally less preferred than that involving preliminary filling with the fluid of lesser density.

The light phase outlet openings in the external conduits such as 6 and 18 which open into the upper layer hydrocarbon phase of the contacting zones is preferably as high above the level of the interface between the hydrocarbon and extract phases as possible to permit maximum contact between the downwardly flowing finely divided droplets of glycol extractant and the hydrocarbon phase which constitutes the continuous phase in the embodiment of the invention illustrated by Figure 1. The naptha phase outlet openings of the external conduits in any particular contacting zone may be on the side of the column opposite to the side on which the naphtha phase inlet openings of the conduits are located, to permit transverse flow of the naphtha across the region of descending droplets of redistributed extractant falling downwardly from the superadjacent perforated plate into the extract layer, as shown, thereby providing a large area of contact between the hydrocarbon and extractant phases. A similar or improved result may be achieved by employing a plurality of external conduits extending through each partition and uniformly distributed throughout the area of the partitions.

The naphtha phase flows upwardly through the column through conduits 19, 20, 21, and 22 and eventually around the spray head 8 and out of the top of the column by way of raffinate outlet conduit 23. The raffinate may be sent to storage or into a series of succeeding extraction columns as the inlet feed stock thereto for further extraction of the aromatic components therefrom, if incomplete in one column, or for the removal of other components therefrom in succeeding extraction columns which may employ other selective solvents, as desired. As a result of the enhanced efficiency of the present extraction procedure, however, the raffinate removed from the column through conduit 23 consists essentially of non-aromatic hydrocarbons, for example paraffinic hydrocarbons, naphthenic hydrocarbons, and olefins when the charging stock to the column is a petroleum naphtha fraction containing the above classes of hydrocarbons and when a sufficient number of perforated plates is present in the extraction column to effect the desired degree of separation.

It is to be noted that the use of external conduits for transfer of the continuous phase between contacting zones constitutes a preferred mode of constructing the extraction apparatus because of the substantially greater degree of countercurrent contact between fluid phases obtained thereby, as distinguished from fluid transfer conduits which rise vertically through the perforated partitions. This is true because a greater number of perforations may be incorporated into the sieve deck per unit of deck diameter, and further, because the continuous phase enters each contacting zone at the extreme periphery of the zone, thereby providing a maximum distance for transverse flow of the continuous phase across the column and maximum contact between the dispersed and continuous phases. The efficiency of countercurrent contact is thereby substantially enhanced.

One of the preferred designs for the transfer conduits connecting the individual contacting zones and providing a channel through which the continuous phase is transferred between adjacent contacting zones in the present extraction or contacting column is illustrated in Figure 2 of the accompanying drawing which represents a cut-away section of a typical extraction column; the construction is particularly advantageous when cooling or heating of the continuous phase stream is desirable for maximum efficiency of extraction. The preferred design illustrated comprises a housing 1' an external transfer conduit or riser 18' having an upper portion terminating a substantial distance above the perforated partition or plate 16', and a lower portion terminating a substantial distance below the plate 16', each terminal of the conduit being in adjacent contacting zones; the latter plate being fastened to the inside surface of housing tube 1'. The external conduit 18' is enclosed by jacket 24 containing a heat transfer fluid which may be gaseous or liquid and may be hotter or colder than the continuous phase fluid passing through conduit 18'. Outlet and inlet pipes 25 and 26 may be provided on the jacketed enclosure to provide for continuous circulation of the heat transfer fluid through the jacketed enclosure. Thus, by the means illustrated heating or cooling of the continuous phase fluid may be obtained during operation of the extraction or contacting process, whichever is more advantageous in effecting the extraction process. The flow of heat transfer fluid through jacket 24 is preferably countercurrent to the flow of continuous phase through conduit 18.

One of the preferred designs of the external transfer conduit is illustrated in Figure 2, said conduit containing a projecting lip portion 27, comprising an internal extension of the fluid transfer conduit 18' into the contacting zone, the extended lip portion proceeding a guard against the flow of heavy fluid into the external conduit when the heavy fluid is the dispersed phase entering the contacting zone through perforations in the superadjacent sieve deck partition. The provision of the lip portion on the upper extremity of the transfer conduit is a particularly advantageous modification when the heavy fluid has a tendency to wet the surface of the material out of which the extraction apparatus is fabricated, since in the latter contingency, the heavy fluid flowing through the perforations immediately above the upper opening in the wall of the housing would otherwise have a tendency to flow down the side of the column into the upper opening in the external conduit, accompanied by a loss in efficiency of column operation.

An alternative embodiment of the process and apparatus of the invention is illustrated in Figure 3 of the accompanying drawings. The apparatus is essentially similar to that described above with reference to Figure 1. However, in the process embodiment illustrated in Figure 3, the light phase, either gaseous or liquid, is passed in the dispersed state, namely in redistributed or comminuted form upwardly through layers of the denser phase in the column, the denser phase layers thus constituting the continuous phase fluid of the system and the the redistribution of the light phase being effected by means of the superimposed perforated partitions spaced vertically in substantially horizontal arrangement within the column, as described above for Figure 1.

For the purpose of illustration, the alternative embodiment is described with reference to a system wherein a naphtha fraction is the light phase and a selective solvent is the denser phase, and wherein this solvent is incompletely miscible with the naphtha fraction, is more dense than the naphtha, and has a preferential solubility for the aromatic hydrocarbon content of the naphtha fraction.

The apparatus comprises a substantially vertical, tubular housing 101, containing a series of superimposed perforated partitions, the highest partition or plate 102 in the column being shown as a sieve deck of conventional and common design. The naphtha fraction introduced as light phase into the column is a mixture of at least one aromatic hydrocarbon as the extractable component thereof, and one or more paraffinic and/or naphthenic hydrocarbons which do not dissolve appreciably in the solvent. The naphtha is introduced into the fluid-liquid contacting apparatus below the solvent inlet, as for example, through feed inlet conduit 103 in controlled amounts determined by valve 104. The naphtha flows upwardly in the column through the perforations in the lowermost perforated partition 105 which effects redistribution of the naphtha as discrete droplets in the solvent phase above the partition. The pressure maintained on the feed stock forces the naphtha in comminuted form through the perforations in the sieve deck trays, and the droplets rise to the top of the layer of denser solvent residing on tray 105 and then combine to form a naphtha layer above the liquid-liquid interface in the contacting zone above said tray. In a similar manner, the naphtha phase rises as a discontinuous phase, that is, in redistributed, comminuted form, through successive superadjacent perforated partitions and finally through the highest tray 102 in the column and is thereafter removed from the column through raffinate outlet 106, above the solvent inlet 107 in the upper portion of the column. The raffinate comprises the non-extracted components of the feed stock.

The solvent is preferably introduced as a finely divided spray in the upper portion of the column, for example, through spray head 108. The solvent droplets flow countercurrently downward against the naphtha phase flowing upwardly from plate 102. The solvent accumulates on the uppermost perforated partition 102 and when the solvent level above plate 102 reaches the inlet opening of external conduit 109, it then flows over the weir provided by the top open end (that is, the inlet end) of the external transfer conduit 109, and is passed downwardly in a confined stream through the conduit 109, and into the solvent layer of the contacting zone above the subadjacent tray 110. The lower end of the transfer conduit is preferably extended well below the interface between the fluid layers on each subadjacent tray in order to afford maximum contact between the continuous phase of denser fluid (the solvent) and the lighter fluid (the naphtha) which ascends in the dispersed state through the continuous phase, and also to permit separation of any emulsion that may be present in the conduit as a result of turbulent mixing the naphtha and solvent phases flowing from the interface of layers into the transfer conduits. The solvent settles to the bottom of the transfer conduit, issues from the lower opening thereof in the wall of tubular housing 101 and flows transversely across the column and thereby undergoes maximum countercurrent contact with the droplets of naphtha phase rising vertically through the substantially horizontally flowing extractant. The solvent thereafter flows through subadjacent contacting zones in a similar manner, and finally through the lowest transfer of downcomer conduit 112 into the lowest layer of solvent. Thus, the lower, open end (outlet) of conduit 112 is contiguous with an opening in the housing wall below the lowermost perforated partition 111 and terminates with its open lower or discharge end below the interface of layers of the lowermost contacting zone and below the inlet of the feed, or light fluid. The solvent, or extract phase is withdrawn from the column through conduit 109 containing valve 116.

The interface level in the lowermost contacting zone is desirably controlled at a substantially constant level above the outlet 113 of external conduit 112 in order to prevent the fresh naphtha from rising through the latter external conduit. This interface is also maintained below the bottom surface 111 of partition 105, in order to prevent reduction in the efficiency of the column through loss of the lowermost contacting zone. Also, unless the interface level is controlled in the zone beneath the lowermost plate, the solvent may tend to accumulate in the lower portion of the column, eventually rising through superadjacent plates and filling the tower. It is evident that heavy fluid will not flow into a subadjacent contacting zone as a continuous phase until the level of such heavy fluid in any contacting zone attains the height of the upper, open end of the external transfer conduit, the height represented by the lower edge of the transfer conduit opening in the wall of the housing such as 117 in transfer conduit 109.

Because of the tendency of two liquids to undergo emulsification when one liquid is contacted with the other liquid in subdivided droplet state under conditions of relative flow therebetween, as in the present embodiment of the invention, it is important to maintain a naphtha layer of substantial thickness above the solvent layer in each contacting zone so that two distinct phases are provided into which the components of the emulsion may transfer and separate. To obtain the maximum advantages of such emulsion separation, the interface and resulting fluid layers are provided in the lowermost contacting zone and in each superadjacent contacting zone above it. The interface level sensing and control device illustrated in Figure 3 comprises a heavy fluid level sensing element, such as the ball float 114 attached to arm 115 which is pivoted in the wall of the column housing. As the level of the interface between the light and heavy fluids in the lowermost contacting zone rises as a result of the influx of heavy fluid from the superadjacent plate through the lowermost transfer conduit into the heavy fluid layer, the ball float rises, forcing arm 115 to act on valve 116, widening the opening of the latter and allowing extract to flow at an increased rate from the column through extract outlet conduit 109. As the interface level falls in the lowermost contacting zone, ball float 114 is lowered and through coaction with valve 116, restricts the flow of the liquid extract phase through extract outlet conduit 109. Any other suitable level sensing and controlling means for either automatic or manual operation or for a combination thereof may be used for maintaining the interface in the lowest contacting zone.

As in the embodiment of Figure 1 of the drawings, only a single external conduit, such as conduit 109 and 112, respectively, is shown in Figure 3 for transferring the continuous phase fluid from its layer in one contacting zone to its layer in the next zone in the line of flow of this fluid; it is to be understood that any desired number of such external transfer conduits may be used for the same purpose. When a plurality of external transfer conduits is used for the passage of the continuous phase fluid (namely the lighter fluid in the embodiment of Figure 1, and the denser fluid in the embodiment of Figure 3) from any one contacting zone to the next, all of the transfer conduits connecting one contacting zone with the next zone will have their inlet openings positioned in substantially a single horizontal plane in the one zone, and their outlet openings positioned in substantially a single horizontal plane in the next zone.

Although the extraction process and apparatus of this invention have been described with reference to the use of an aqueous diethylene glycol solution as the solvent, it is evident that other liquid extractants may likewise be utilized, provided the feed stock and solvent fluids differ in specific gravities or densities and provided, further, that the fluids are substantially immiscible in each other, thereby providing the conditions essential for the formation of an interface between the feed stock and solvent phases. When applying the one or other of the two principal embodiments of the present invention to the scrubbing or extraction treatment of a liquid material with the aid of a solvent which has a lower density or specific gravity than the liquid material to be treated, it is evident that the solvent constitutes the lighter fluid of the system and will be introduced into the top portion of the contacting column, such as that of Figure 1 or 3, and will be passed downwardly therethrough in a generally countercurrent flow to the heavier liquid material to be treated, which is introduced into the lower portion of such column.

We claim as our invention:

1. A contacting apparatus which comprises in combination a vertically elongated column, vertically spaced, substantially horizontal, perforated partitions dividing the column into a plurality of contacting sections, a conduit connecting to the highest contacting section for supplying liquid thereto, a conduit connecting to the lowest contacting section for withdrawing liquid therefrom, flow-controlling means in at least one of the aforesaid conduits, a fluid supply conduit connecting to said lowest section, a fluid withdrawal conduit connecting to said highest section, each two adjacent contacting sections being connected with each other by a fluid transfer conduit having an upper opening above and a lower opening below the partition between said adjacent contacting sections and externally positioned with respect thereto, the upper opening of the transfer conduit connecting to the next lower section being at a higher elevation than the lower opening of the transfer conduit connecting to the next higher section, and interface level sensing means in at least one of the contacting sections adapted to control liquid flow rate in response to variations in interface level between liquid and fluid and to maintain the interface in an adjacent section at a substantially constant level.

2. The apparatus of claim 1 further characterized in that said externally positioned fluid transfer conduit is provided with a jacket containing a heat transfer fluid surrounding said transfer conduit.

3. The apparatus of claim 1 characterized in that the sensing device is associated with the highest contacting section of the column and is connected with an actuating device which is adapted to actuate flow controlling means in the conduit for withdrawing fluid from the lowest contacting section.

4. The apparatus of claim 1 characterized in that the sensing device is associated with the highest contacting section of the column and is connected with an actuating device which is adapted to actuate flow controlling means in the conduit for introducing liquid into the highest contacting section.

5. The apparatus of claim 1 characterized in that the upper extremity of each fluid transfer conduit is provided with a lip projecting into the contacting section in which the conduit opens.

6. In a process for effecting countercurrent contact between two fluids of incomplete miscibility and of different densities, at least the denser fluid being a liquid, wherein the denser fluid is continuously introduced into the highest zone of a plurality of superimposed contacting zones and passed downwardly through said zones and the lighter fluid is continuously introduced into the lowest of said zones and passed upwardly through said zones, an upper layer of the lighter fluid and a lower layer of the denser fluid are established in each of N contacting zones, N being at least 2, fluid from one of said layers in each of N-1 contacting zones is passed into an adjacent zone and in dispersed state in direct contact with the layer of the other fluid therein and then into the layer of like fluid in said adjacent zone, fluid from the other of said layers in each of N-1 zones is passed from approximately the interface between the fluid layers therein through at least one transfer conduit in a confined, substantially continuous stream into the layer of like fluid in an adjacent zone, a stream of the lighter fluid is withdrawn from the highest contacting zone, a stream of the denser fluid is withdrawn from the lowest contacting zone and the flow of said denser fluid is so controlled that the outlet of the transfer conduit is maintained surrounded by the fluid effluent thereof in that zone which in the direction of flow of the fluid transferred through the transfer conduit is the last zone containing an interface between layers, a start-up procedure for said process which comprises substantially filling said contacting zones with light fluid, introducing heavy fluid into the uppermost contacting zone, continuing the introduction of denser fluid until a layer of said denser fluid is established in all of the contacting zones below said last zone containing an interface between layers, and thereafter controlling the rate of introducing denser fluid into said uppermost zone while maintaining a substantially constant interface level between fluids in all zones below said last zone.

References Cited in the file of this patent

UNITED STATES PATENTS

| 1,725,925 | Kent | Aug. 27, 1929 |
| 1,803,956 | Bergman | May 5, 1931 |
| 1,943,822 | Harrington | Jan. 16, 1934 |
| 2,121,324 | Manley | June 21, 1938 |